Sept. 8, 1953
H. G. MURPHY
2,651,123
PLOW-CONVEYER-THROWER COMBINATION
TYPE DITCHING MACHINE
Filed June 13, 1949
2 Sheets-Sheet 2
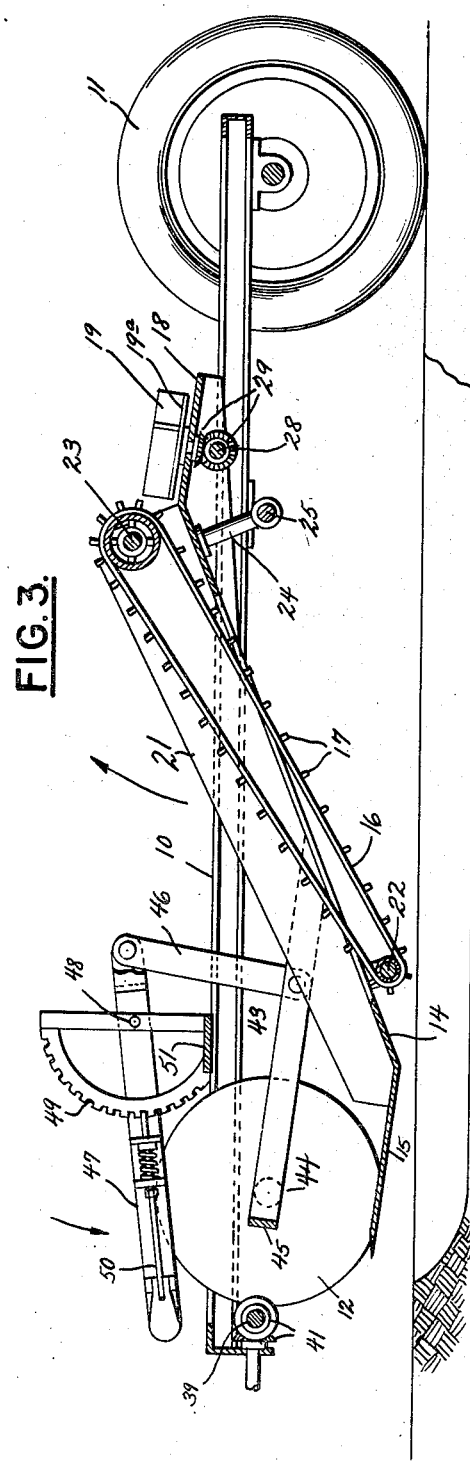
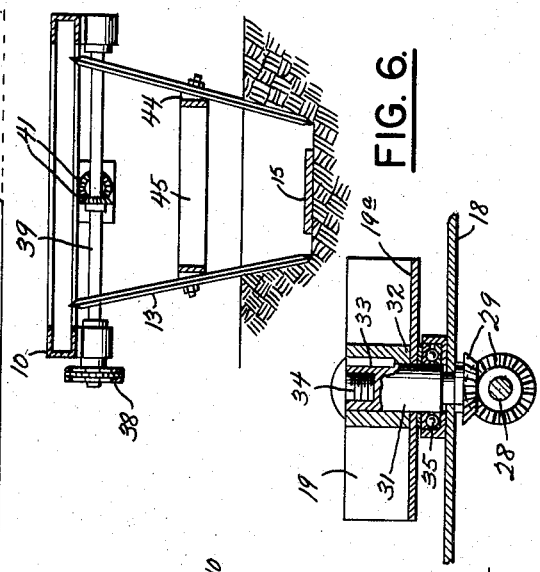
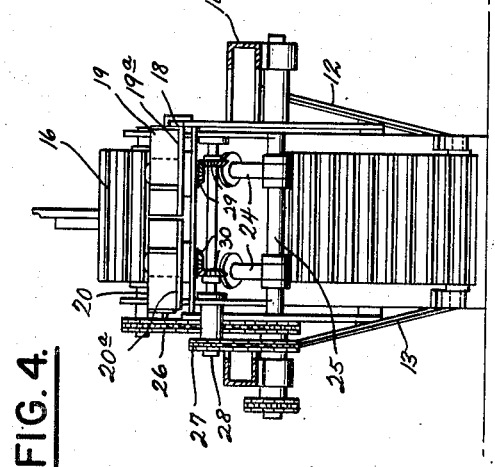
INVENTOR.
Horace G. Murphy
BY
Mawhinney & Mawhinney
ATTORNEYS Patented Sept. 8, 1953

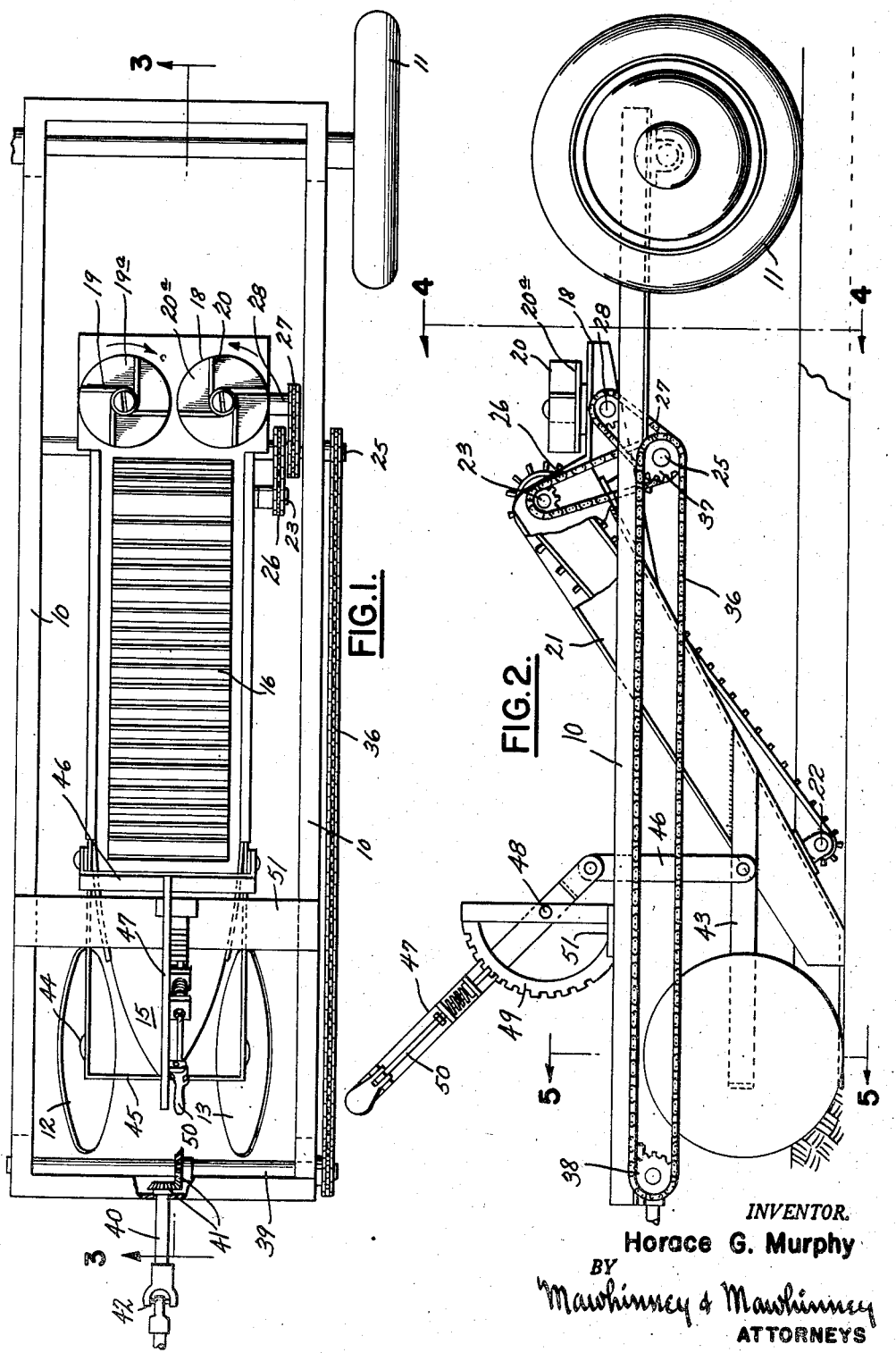

2,651,123

UNITED STATES PATENT OFFICE 2,651,123

PLOW-CONVEYER-THROWER COMBINATION TYPE DITCHING MACHINE

Horace G. Murphy, Cambridge, Md.

Application June 13, 1949, Serial No. 98,754

3 Claims. (Cl. 37—101)

1

The present invention relates to improvements in a plow-conveyor-thrower combination type ditching machine and more particularly relates to an improved machine for use in opening ditches and trenches in open fields to relieve the standing water due to rainfall and other reasons.

An object of the invention is to provide an improved ditching and trenching machine which in one continuous operation will cut the side and and bottom walls of a ditch or trench and then move on to crowd the removed earth onto a conveyor elevator which will lift the same and deposit such earth upon rapidly rotating spreaders that will throw the earth at a large range at adjacent portions of the field to either or both sides of the machine as such machine progresses through the field.

It is another object of the invention to provide an improved ditching and trenching machine of a compact and efficient construction adapted to be pulled behind a tractor and to receive its power from the power take-off drive shaft of the tractor; and wherein the cut depth control of the machine projects forwardly ready to the hand of the operator of the tractor for adjusting the depth of the cut made by the disc and scoop plow cutters.

A still further object of the invention resides in providing an improved ditching and trenching machine in which the various agencies are grouped in small compass on a supplemental frame having a vertically pivotal movement in a main frame adapted to be drawn after a tractor and in which a simple form of gearing is connected to drive the conveyor and the spreader wheels from power derived from the tractor.

With the foregoing and other objects in view, the invention will be more fully described hereinafter, and will be more particularly pointed out in the claims appended hereto.

In the drawings, wherein the symbols refer to like or corresponding parts throughout the several views, Figure 1 is a top plan view of an improved ditching and trenching machine constructed in accordance with the present invention with parts broken away.

Figure 2 is a side elevational view of the same with the earth cutting devices in the lowered operative position.

Figure 3 is a longitudinal vertical sectional view taken on the line 3—3 in Figure 1 and illustrating the earth cutting implements raised from the earth.

2

Figure 4 is a transverse vertical sectional view taken on the line 4—4 in Figure 2.

Figure 5 is a similar view taken on the line 5—5 in Figure 2, and

Figure 6 is a fragmentary vertical sectional view of a detail taken on an enlarged scale through one of the spreader wheels and its mounting and drive arrangement.

Referring more particularly to the drawings, 10 represents a main frame which may be of the rectangular form shown supported at the rear portion by rubber tired or other rear wheels 11 and at its front portion partly by the cutting discs 12 and 13 and the scoop plow 14 and its detachable rigid plow point 15 and partly by such support as the forward part of the main frame 10 may receive from being coupled to a tractor or other vehicle by which the machine is adapted to be drawn through the field.

The discs 12 and 13 are spaced horizontally apart and laterally of the main frame 10 and the plow point 15 is received in the space between the lower edges of the discs 12 and 13 and lies at a level with a point of tangency with the lowermost portions of the discs 12 and 13. The mold-board 14 of the scoop plow inclines upwardly to an endless elevator conveyor 16 preferably having cross cleats 17 for more efficiently lifting the removed earth up to a platform 18 lying beyond the upper end of the conveyor 16. On and above this platform are the oppositely rotating spreading wheels 19 and 20 adapted to be driven rapidly to throw out the earth to opposite sides of the machine for which purposes these spreading wheels 19 and 20 are in an elevated position above the platform and above any gearing that might otherwise be in the path of the projected earth.

An auxiliary or supplemental frame 21 carries the scoop plow 14, 15, the conveyor 16, platform 18 and the spreading wheels 19 and 20. The lower conveyor shaft 22 is carried by brackets 22a which in turn are carried on the underside of the side members of the supplemental frame 21 and journalled therein. The upper conveyor shaft 23 is journalled in the supplemental frame 21 and posts 24 carrying the supplemental frame 21 have a vertically pivotal movement about a drive shaft 25 which is journalled in appropriate bearings carried beneath the main frame 10.

A sprocket and chain drive 26 extends from the drive shaft 25 to the upper conveyor shaft 23; and a sprocket and chain drive 27 is arranged between the drive shaft 25 and the spreader shaft 28 which is journalled in the supplemental frame 21 beneath the platform 18.

As shown more particularly in Figure 4 bevel gear couples 29 and 30 are arranged to drive the spreader wheels 19, 20 from the spreader shaft 28, the arrangement being such that the spreader wheels are driven in opposite directions as indicated by the arrows in Figure 1 whereby the spreader wheel 19 will throw the earth to the right side of the machine while its companion spreader wheel 20 will throw the earth to the left side of the machine frame 10.

As shown more particularly in Figure 6 the spreader wheels are mounted upon upright stub shafts 31 with the hubs 32 of the spreader wheels splined or keyed to the stub shafts 31 as indicated at 33, there also being preferably lock screws 34 threaded into the stub shafts 31 for maintaining the keys 33 in place. The shafts and hubs rotate upon ball or other bearings 35. These spreader wheels are composed of the hubs 32 and the outwardly extending vanes or paddles 19, 20.

While the conveyor 16 and the spreader wheels 19, 20 may be driven by any appropriate gearing or mechanism, it will be found convenient to drive the same by a drive chain 36 arranged at one side of the frame 10, which drive chain is trained over a rear sprocket wheel 37 fixed on the drive shaft 25 and a forward sprocket wheel 38 fixed upon a front transverse shaft 39 mounted in appropriate bearings in the front portion of the main frame 10. This main frame 10 also accommodates a front longitudinal shaft 40 which drives the front transverse shaft 39 through a bevel gear couple 41. The shaft 40 extends forwardly of the frame 10 and is adapted to be coupled to the power take-off drive shaft of a tractor. A universal joint 42 will preferably be included in the longitudinal shaft 40 to permit of relative vertical movement between the tractor and front portion of the main frame 10 incident to the travel of these two separate vehicles over the rough ground of a field.

Arms 43 form parts of the supplemental frame 21 and extend forwardly for the purpose of providing hub bearings 44 for the disc cutters 12 and 13. It will be noted, particularly from Figure 5 that these disc cutters 12 and 13 are mounted at an angle to the vertical with the lower portions of the discs 12 and 13 converging downwardly whereby to cut sloping side walls in the ditch or trench. The forward portions of the arms are connected by a connecting cross beam 45 for purposes of strength and rigidity. A yoke 46 is pivoted at its lower ends to the arms 43 and its upper end is pivoted to the lower end of a hand lever 47 fulcrumed at 48 on a toothed sector 49. This sector is mounted upon a cross rail 51 of the main frame. A spring latch 50 on the hand lever 47 is arranged to engage the notches in the sector 49 for holding the supplemental frame at a correctly adjusted vertical position for regulating the depth of cut.

In operation, the machine progresses through the field drawn by a tractor or in any other suitable manner and with the shaft 40 driven from the tractor engine in a well understood manner. This drive extends back through the shaft 39, side chain 36 to the operating shaft 25 and through the gearing 26, 27 to the conveyor and the spreader wheels. The lever 47 is adjusted, for instance to the position shown in Figure 2, and the tractor thereupon moves forward to draw the machine through the field with the rubber tires 11 extending on opposite sides of the trench while the plow point 15 is at the depth required to form the bottom of the trench and with the lower edges of the discs 12 and 13 penetrating a like depth to cut the side walls of the trench down to the bottom being cut by the plow point 15.

As the machine moves forward the earth cut by the discs 12, 13 and the plow point 15 will be crowded upon the mold board 14 and thence up to the conveyor 16 by which it will be lifted to a point above the rotating spreaders 19, 20 and deposited therethrough upon the platform 18. Due to the gear arrangement these spreaders will be rapidly rotating and will therefore throw the earth laterally of the machine over a wide adjacent area of the field so that it will not be necessary to redistribute this earth as would be the case if a high mound was formed alongside the trench pursuant to the digging operation.

If desired a deflector may be used to deflect the earth away from one of the spreader wheels as where the machine is moving along close to a fence or highway in which case it is undesirable to throw the earth in that direction.

By shifting the lever 47 up or down, the supplemental frame 21 may be caused to pivot about the main drive shaft 25 and thereby either elevate or lower the cutting implements at the forward end of this supplemental frame. In this way the implements may be raised completely out of the ground as indicated in Figure 3 for the purpose of moving to and from the ditch, trench or other work; or the cutting implements may be lowered to any depth desired to regulate the depth of the ditch or trench being cut.

The device will be found useful for cutting new ditches and trenches and also for clearing and renewing old ditches and trenches.

The rigid plow point 15 may be curved as indicated in Figure 1 and preferably is pointed at its extreme forward end. The edges diverge backwardly from the point preferably overlapping the lower edges of the discs in order that the bottom section of the earth may be severed by this plow point out to the side walls of the ditch which have been cut by the discs. The plow point is preferably detachable so that it can be removed for sharpening. The discs 12, 13 may be made removable for the same purpose.

The fins 19, 20 extend off the hubs 32 on a substantial tangent with the outside faces of the tangential fins leading in a rotational sense. In this aspect the fins are relatively reversed in position on the two spreader wheels 19, 20 whereby each to produce a slap effect on the earth.

The spreader wheels preferably comprise not only the fins 19, 20 but also metal or other discs or plates 19ª and 20ª which rotate each as one unit above the platform 18.

Although I have disclosed herein the best form of the invention known to me at this time, I reserve the right to all such modifications and changes as may come within the scope of the following claims.

What I claim is:

1. An improved ditching and trenching machine comprising a main frame, wheels for supporting the rear portion of the main frame for rolling movement through the field, longitudinal and transverse shafts attached to the forward portion of the machine geared together and positioned and adapted to receive rotary motion from the power take-off of a tractor, a drive shaft transversely mounted across the rear portion of said main frame, chain and sprocket gearing between said forward transverse shaft and said drive shaft, a supplemental frame, means for pivotally mounting said supplemental frame about said drive shaft to move in a substantial vertical plane through the main frame, cutting implements carried by the forward portion of said supplemental frame, a conveyor elevator carried by an intermediate portion of said supplemental frame and pivoted in the upper end of the supplemental frame, oppositely rotating spreader wheels mounted upon the rear portion of said supplemental frame in position to receive earth from the delivery end of said conveyor elevator, and gearing from said drive shaft to the conveyor and said spreader wheels.

2. An improved ditching and trenching machine comprising a main frame, wheels for supporting the rear portion of the main frame for rolling movement through the field, a drive shaft mounted transversely across the rear portion of said main frame, means for rotating said drive shaft from the power take-off of a tractor, a supplemental frame, means for pivotally mounting said supplemental frame about said drive shaft to move in a substantially vertical plane through the main frame, cutting implements carried by the forward portion of said supplemental frame, a conveyor elevator carried by an intermediate portion of said supplemental frame in position to receive earth from said cutting implements and connected to the upper end of the supplemental frame, oppositely rotating spreader wheels mounted upon the rear portion of said supplemental frame in position to receive earth from the delivery end of said conveyor elevator, and gearing from said drive shaft to the conveyor and said spreader wheels.

3. An improved ditching and trenching machine comprising a main frame, wheels for supporting the rear portion of said main frame for rolling movement through the field, a drive shaft mounted transversely across the rear portion of said main frame, means for driving said drive shaft from the power take-off of a tractor, a supplemental frame pivotally mounted at its rear portion in the main frame and extending downwardly and forwardly through the main frame, cutting implements carried by the forward portion of said supplemental frame, means on the main frame coupled to the forward portion of said supplemental frame for lifting and lowering the forward portion of said supplemental frame together with said cutting implements, a conveyor elevator carried by an intermediate portion of said supplemental frame and connected to the upper end of the supplemental frame with its forward end in position to receive earth from said implements, oppositely rotating spreader wheels mounted upon the rear portion of said supplemental frame in position to receive earth from the rear delivery end of said conveyor elevator, and gearing from said drive shaft to the conveyor and said spreader wheels.

HORACE G. MURPHY.

References Cited in the file of this patent

UNITED STATES PATENTS

| Number | Name | Date |
|---|---|---|
| 40,120 | Proctor et al. | Sept. 29, 1863 |
| 264,062 | Bonnell | Sept. 12, 1882 |
| 300,318 | Hershberger | June 10, 1884 |
| 647,198 | Rasmussen | Apr. 10, 1900 |
| 954,677 | Howatt | Apr. 12, 1910 |
| 1,349,498 | Daywitt | Aug. 10, 1920 |
| 1,767,017 | Scheckler | June 24, 1930 |
| 2,340,657 | Goertzen | Feb. 1, 1944 |